(12) United States Patent
Castellano (10) Patent No.: US 10,510,204 B2
(45) Date of Patent: Dec. 17, 2019

(54) APPARATUS FOR THE PREPARATION AND DISPENSING OF BAKERY FOOD PRODUCTS, IN PARTICULAR PIZZAS

(71) Applicant: Martina Lisa Castellano, Legnano (IT)

(72) Inventor: Martina Lisa Castellano, Legnano (IT)

( * ) Notice: Subject to any disclaimer, the term of this patent is extended or adjusted under 35 U.S.C. 154(b) by 0 days.

(21) Appl. No.: 15/955,959

(22) Filed: Apr. 18, 2018

(65) Prior Publication Data

US 2018/0308308 A1    Oct. 25, 2018

(30) Foreign Application Priority Data

Apr. 19, 2017    (IT) .................. 102017000043109

(51) Int. Cl.
*G07F 17/00*    (2006.01)
*G07F 9/10*    (2006.01)
(Continued)

(52) U.S. Cl.
CPC ........ *G07F 17/0078* (2013.01); *A47J 37/044* (2013.01); *A47J 39/006* (2013.01);
(Continued)

(58) Field of Classification Search
CPC .... G07F 17/0078; G07F 9/105; A47J 37/044; A47J 39/006; A47J 41/0044; A47J 47/01; A47J 37/0658
(Continued)

(56) References Cited

U.S. PATENT DOCUMENTS 4,179,985 A * 12/1979 Baker .................. A47J 37/044
99/339
4,660,467 A * 4/1987 Waks .................. A22C 7/0076
426/523
(Continued)

FOREIGN PATENT DOCUMENTS

EP    0482473 A1    4/1992
EP    0896303 A2 *    2/1999 ............. G07F 9/105
(Continued)

*Primary Examiner* — Rakesh Kumar
(74) *Attorney, Agent, or Firm* — Pearne & Gordon LLP (57) ABSTRACT

An apparatus (1) for the preparation and dispensing of bakery food products, in particular pizzas, comprising: a magazine (2) containing a plurality of food products (P) having a storage compartment (3) for storing said products (P) in a respective semi-cooked condition; cooling means (4) arranged inside the magazine (2) to keep the compartment (3) of said food products (P) at a predetermined freezing temperature; a supply line (15) for supplying said food products (P) extending between a product loading station arranged in the area of the magazine (2) and a dispensing station for dispensing the food products (P), packaging means (21), located in the area of said dispensing station to arrange each product (P) leaving the supply line (15) inside a respective package (C); said supply line comprising: a first oven (16) arranged downstream of the loading station and configured to thaw the food products (P) leaving the magazine (2); and a second oven (17) interposed between said first oven and said dispensing station and configured to cook
(Continued)

the thawed food product at a given temperature depending on the type of the product (P) itself.

9 Claims, 6 Drawing Sheets

(51) Int. Cl.
    *A47J 37/04*     (2006.01)
    *A47J 39/00*     (2006.01)
    *A47J 41/00*     (2006.01)
    *A47J 47/01*     (2006.01)
    *A47J 37/06*     (2006.01)

(52) U.S. Cl.
    CPC ........... *A47J 41/0044* (2013.01); *A47J 47/01* (2013.01); *G07F 9/105* (2013.01); *A47J 37/0658* (2013.01)

(58) Field of Classification Search
    USPC .................................................. 221/150 HC
    See application file for complete search history.

(56) References Cited

U.S. PATENT DOCUMENTS

| | | | | |
|---|---|---|---|---|
| 4,671,425 A * | 6/1987 | Knoll | ......................... | G07F 9/10 221/122 |
| 4,687,119 A * | 8/1987 | Juillet | ..................... | G07F 9/105 221/101 |
| 5,044,264 A * | 9/1991 | Forney | .................. | A47J 37/044 99/349 |
| 5,105,979 A * | 4/1992 | Bakx | ........................ | G07F 9/105 221/150 HC |
| 5,144,879 A * | 9/1992 | Alessi | ...................... | F25D 23/12 219/679 |
| 5,168,795 A * | 12/1992 | Okada | .................. | A47J 37/1228 221/150 A |
| 5,245,150 A * | 9/1993 | Grandi | ...................... | A21B 2/00 165/61 |
| 5,305,615 A * | 4/1994 | McFadden | .......... | A47J 37/1228 414/331.04 |
| 5,365,835 A * | 11/1994 | Naramura | ............... | G07F 9/105 700/230 |
| 5,522,310 A * | 6/1996 | Black, Sr. | ............... | A47J 27/14 221/113 |
| 5,566,856 A | 10/1996 | Fallen et al. | | |
| 5,582,758 A * | 12/1996 | Smith | ..................... | A21B 1/245 219/400 |
| 5,688,423 A * | 11/1997 | Rudewicz | ............... | A47J 27/14 219/486 |
| 5,799,822 A * | 9/1998 | Rudewicz | ............... | G07F 9/026 219/678 |
| 6,464,104 B1 * | 10/2002 | Waddell | .................... | G07F 9/02 221/150 A |
| 6,550,632 B2 * | 4/2003 | Gubbini | .................. | A21C 9/08 221/13 |
| 7,022,359 B2 * | 4/2006 | Montserrate Gibernau | ............... | B65D 73/02 426/107 |
| 8,234,972 B2 * | 8/2012 | Sands | ................. | A47J 37/1228 221/150 HC |
| 8,253,581 B2 * | 8/2012 | Sands | .................... | B65G 43/08 209/552 |
| 8,469,228 B2 * | 6/2013 | Adams | .................. | G07F 7/0609 211/129.1 |
| 8,651,324 B2 * | 2/2014 | Borghi | .................... | G07F 11/54 221/150 A |
| 9,361,746 B2 * | 6/2016 | Otzen | ................... | G07F 11/165 |
| 9,443,370 B2 * | 9/2016 | Carson | .................... | G07F 9/006 |
| 2001/0002674 A1 | 6/2001 | Gubbini et al. | | |
| 2004/0178213 A1 * | 9/2004 | Martinelli | ................ | G07F 11/54 221/150 R |
| 2018/0308308 A1 * | 10/2018 | Castellano | ............ | A47J 37/044 |

FOREIGN PATENT DOCUMENTS

| | | | |
|---|---|---|---|
| EP | 1107199 A2 | 6/2001 | |
| FR | 2622998 A1 * | 5/1989 | ............ G07F 9/105 |
| WO | 03077213 A1 | 9/2003 | |
| WO | 2005015509 A1 | 2/2005 | |
| WO | 2011023200 A1 | 3/2011 | |
| WO | WO-2011023200 A1 * | 3/2011 | ............ B65G 1/127 |

\* cited by examiner

APPARATUS FOR THE PREPARATION AND DISPENSING OF BAKERY FOOD PRODUCTS, IN PARTICULAR PIZZAS

The present invention relates to an apparatus for the preparation and dispensing of bakery food products, in particular pizzas.

In greater detail, the present invention relates to an apparatus capable of preparing and feeding pizzas automatically, starting from a respective storage condition.

As known, food vending machines consist of apparatuses equipped with an interface to allow the user to select the food product that is supplied in a ready-for-consumption condition.

Generally, these apparatuses consist of a food storage area equipped with a magazine containing the aforementioned products and configured to maintain the products themselves at a given storage temperature.

Downstream of the magazine there is a supply line adapted to pick up the requested product from the magazine and feed it towards a collection area where the food product is collected.

The supply line is equipped with a heating member, which heats the product while it is being fed towards the collection area. In this way, the product is dispensed in a respective ready-for-consumption condition.

For example, when dispensing pizzas, the same are precooked and stored in a storage condition at a freezing temperature. In this way, the heating member only thaws the pizzas, supplying them in the collection area already cooked and ready for consumption.

These apparatuses, although capable of providing bakery products automatically, nevertheless have major drawbacks and operating limits.

First of all, it should be considered that these apparatuses have considerable dimensions deriving from the fact that they have to provide both the magazine containing the frozen products and the relevant heating member.

In particular, in order to be able to contain a large quantity of products, as in the case where different types of pizzas are provided, the magazine is suitably dimensioned with the consequent disadvantages in terms of overall volume.

In order to overcome these drawbacks, lower-capacity, and therefore smaller magazines are produced, which are replenished with high frequency.

However, even this solution is not free from drawbacks, deriving both from the fact that it cannot contain a wide range of products and that it frequently requires manual intervention for replenishment.

In addition, the development of the supply line and therefore of the heating member is also particularly cumbersome and disadvantageous in terms of production costs.

A further major drawback of the known apparatuses is the poor quality of the pizzas, which are precooked and then supplied as thawed.

These storage and preparation conditions are not particularly suitable for bakery food products, which as in the case of pizzas, once thawed, lose the peculiar organoleptic characteristics of the foods that make up the product itself.

Finally, another drawback of the known apparatuses described above is that no systems are provided for correctly packaging the bakery products once they have been dispensed from the apparatus.

In fact, the dispensed ready-for-consumption pizzas are mostly supplied on trays and therefore subject to rapid cooling and deterioration.

Therefore, once dispensed, the pizzas must be consumed immediately to avoid excessive cooling and hence rapid deterioration.

The object of the present invention is therefore to solve the problems encountered in the prior art by providing an apparatus for the preparation and dispensing of bakery food products, in particular pizzas, which overcomes the limitations and drawbacks mentioned above.

In particular, it is an object of the present invention to provide an apparatus having very limited overall dimensions and at the same time capable of storing in a storage condition a large quantity of bakery products, in particular different types of pizzas. The object of the present invention is therefore to make the apparatus versatile, being capable of supplying a wide range of bakery products that are different from each other.

A further important object of the present invention is to provide an apparatus for the automated preparation and dispensing of pizzas, which is structurally simple and low cost.

A still further object of the present invention is to provide an apparatus for the preparation and dispensing of bakery products, which is able to supply ready-for-consumption products while maintaining the organoleptic characteristics typical of the foods that make up each product.

Finally, it is an object of the present invention to provide an apparatus that is capable of dispensing ready-for-consumption bakery products while maintaining the cooking temperature, in order to prolong the preservation of the product exiting the apparatus.

In particular, the present invention relates to an apparatus for the preparation and dispensing of bakery food products, in particular pizzas, comprising: a magazine for containing a plurality of food products having a storage compartment for storing said products in a respective semi-cooked condition; cooling means arranged inside the magazine to keep the compartment of said food products at a predetermined freezing temperature; a supply line for supplying said food products extending between a product loading station arranged in the area of the magazine and a dispensing station for dispensing the food products; and packaging means, located in the area of said dispensing station to arrange each product leaving the supply line inside a respective package. The supply line comprises, in turn, a first oven arranged downstream of the loading station and configured to thaw the food products leaving the magazine; and a second oven interposed between said first oven and said dispensing station and configured to cook the thawed food product at a given temperature depending on the type of the product itself.

The dependent claims correspond to possible embodiments of the invention.

This description is provided with reference to the accompanying figures, also having a purely exemplary and therefore non-limiting purpose, in which.

With reference to the accompanying figures, the numeral 1 indicates, as a whole, an apparatus for the preparation and dispensing of bakery food products P, in particular pizzas, according to the present invention.

Figure 1:
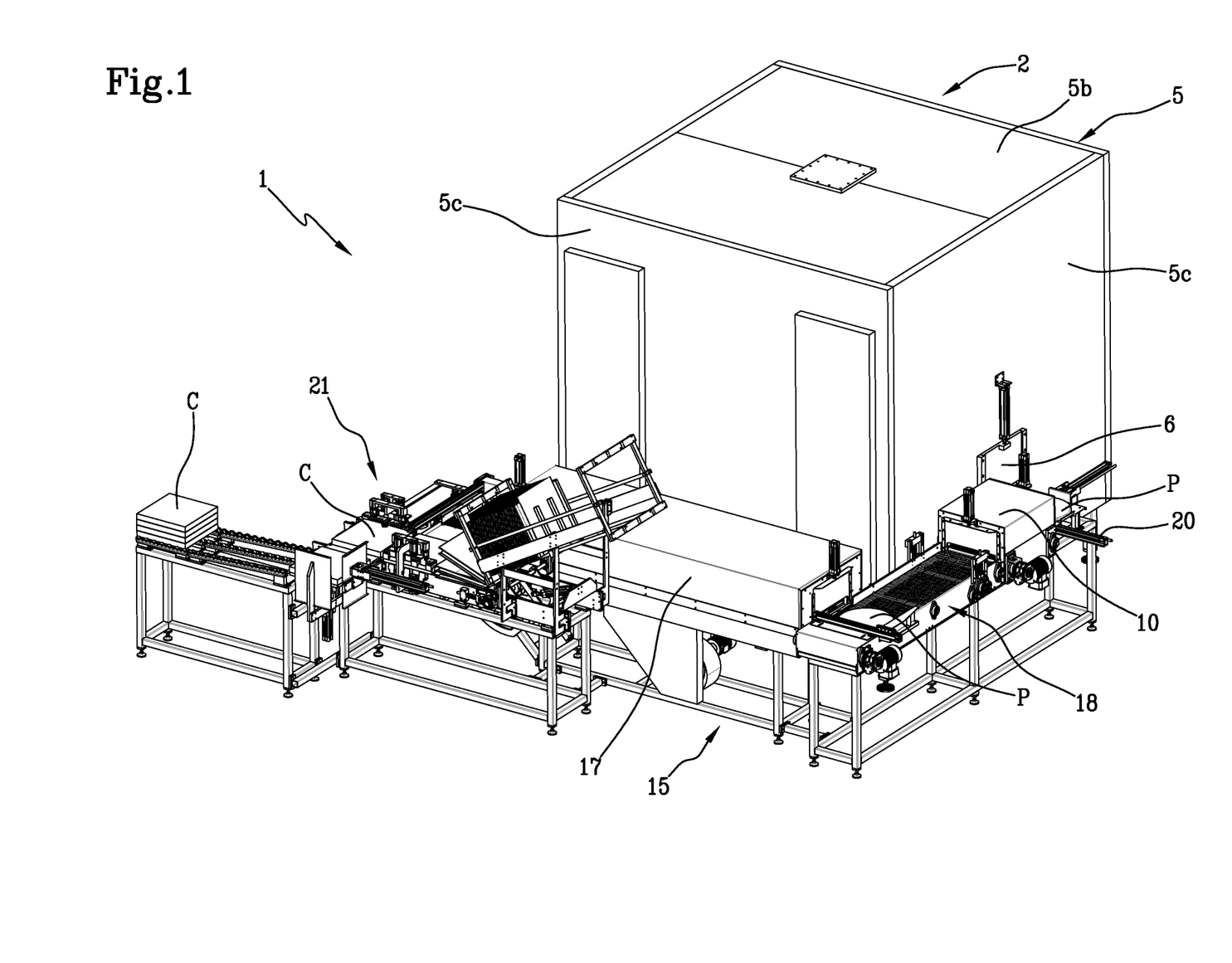
FIG. 1 is a first perspective view of the apparatus according to the present invention.
Figure 2:
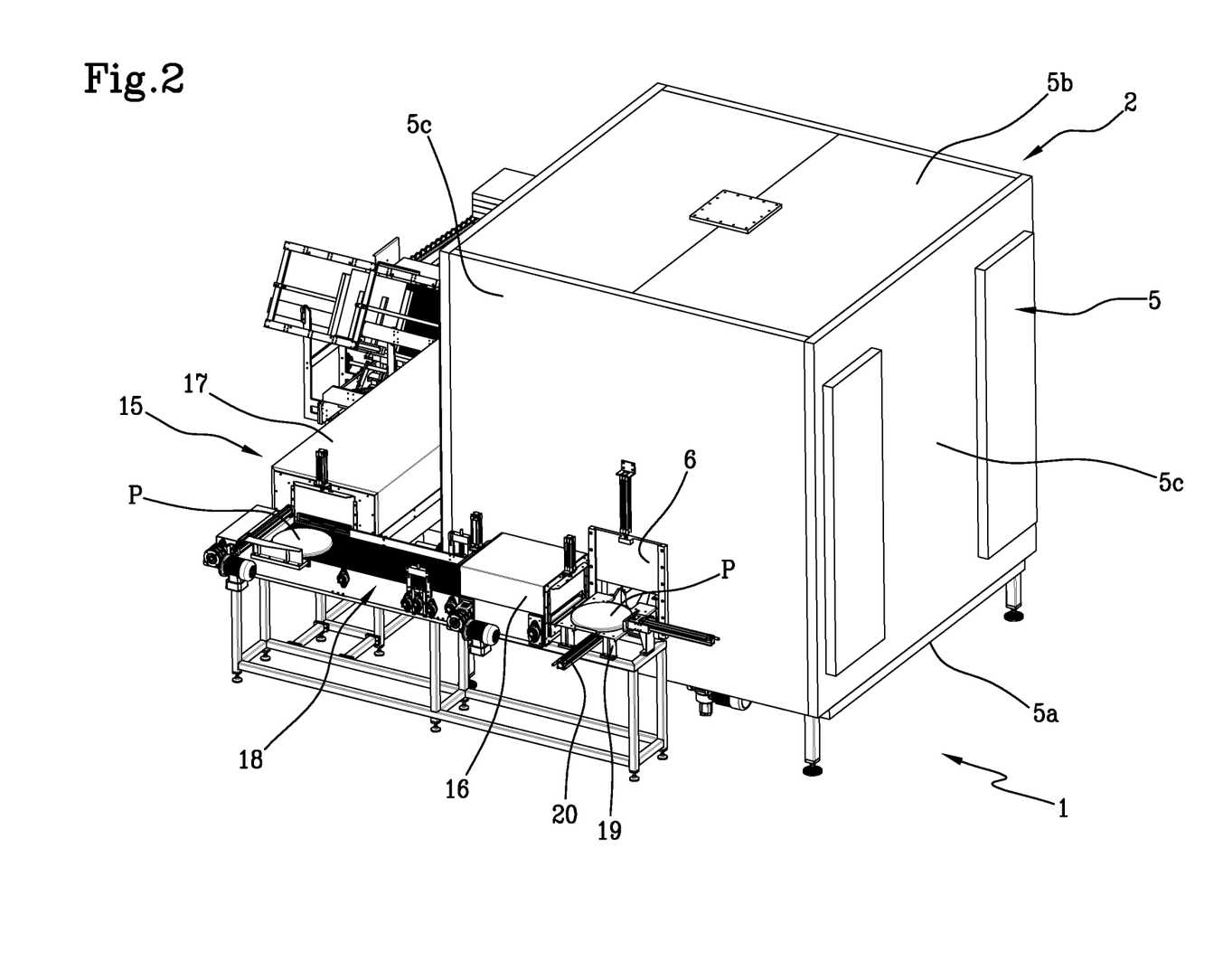
FIG. 2 is a second perspective view of the apparatus according to the present invention.

As illustrated in FIGS. 1 and 2, the apparatus 1 comprises a magazine 2 for containing a plurality of food products P having internally a storage compartment 3 for storing said products P.

It should be noted that the products P inside the compartment 3 are maintained in a respective semi-cooked condition, i.e. a condition in which the products (pizzas) have been precooked only partially (not completely for consumption).

Inside the compartment 3 there are cooling means 4 adapted to keep the compartment 3 of the aforementioned products P at a predetermined freezing temperature.

The cooling means 4, well known and therefore not further described in detail, have a series of fans (FIG. 3) to define a circulation of cold air inside the compartment 3.

Figure 3:
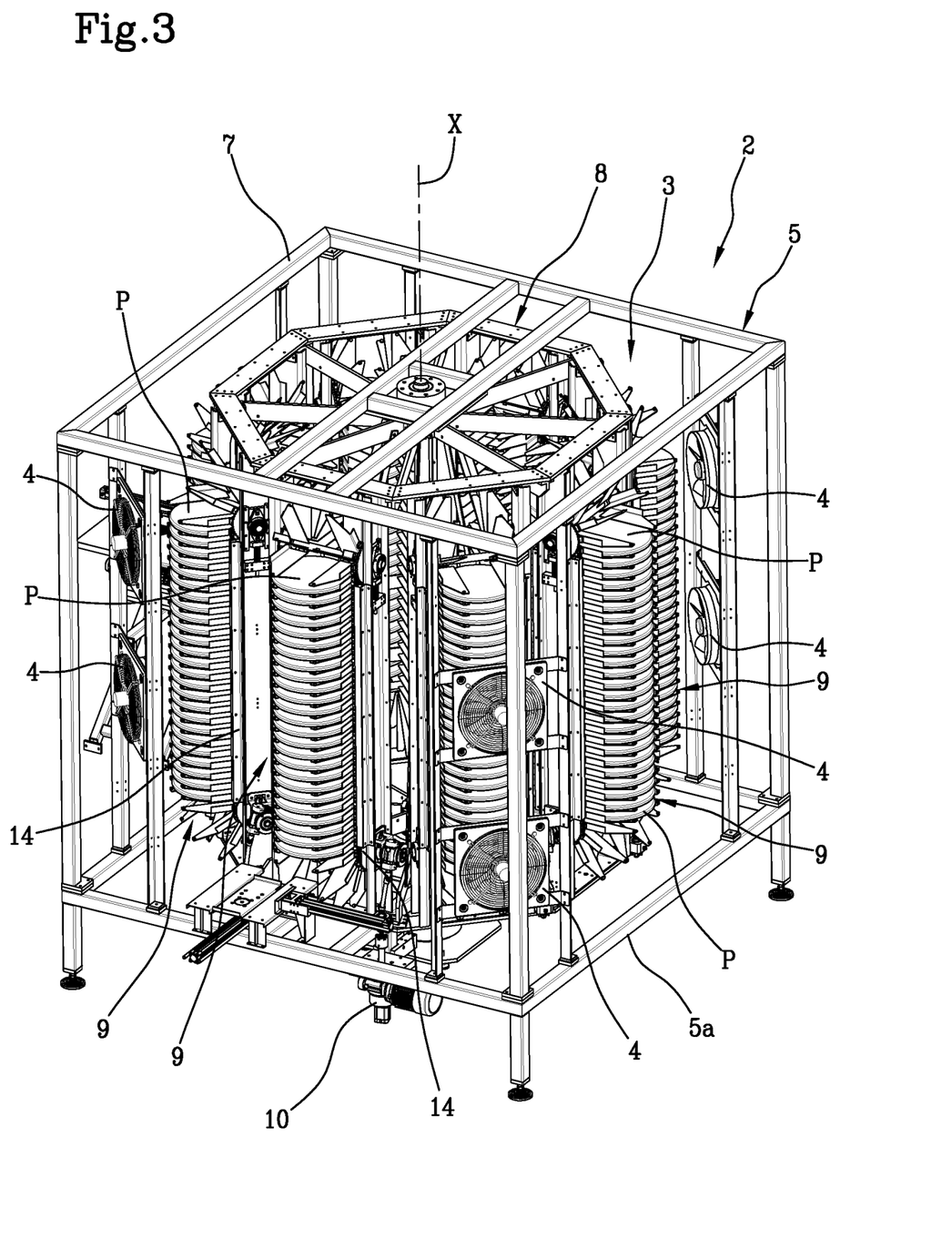
FIG. 3 is a perspective view of a magazine for containing bakery products, which forms part of the apparatus according to the present invention, with some parts removed to better illustrate others.

In this way, the products inside the compartment 3 are always in the respective freezing condition at a controlled temperature adapted to preserve the product P for a long period.

With particular reference to FIG. 3, the magazine 2 consists of a chamber 5 internally defining the aforesaid storage compartment 3 and having at least one opening 6 for access to the compartment 3.

The chamber 5 is defined by a base 5a, an upper wall 5b and a series of side walls 5c. Preferably, in this situation, the chamber 5 has a substantially parallelepiped shape, advantageously with a square or rectangular base. In particular, according to the preferred embodiment illustrated in the accompanying figures, the chamber 5 has a substantially cubic shape in which the opening 6 is defined in one of the four side walls 5c.

In particular, with reference to FIG. 3 where only the chamber 5 without the aforementioned walls 5a, 5b and 5c is shown, there is provided a support frame 7 for supporting the walls and the cooling means 4. Inside the frame 7 there is a carousel 8 arranged in the compartment 3 and rotatable about a respective longitudinal axis X.

Figure 4:
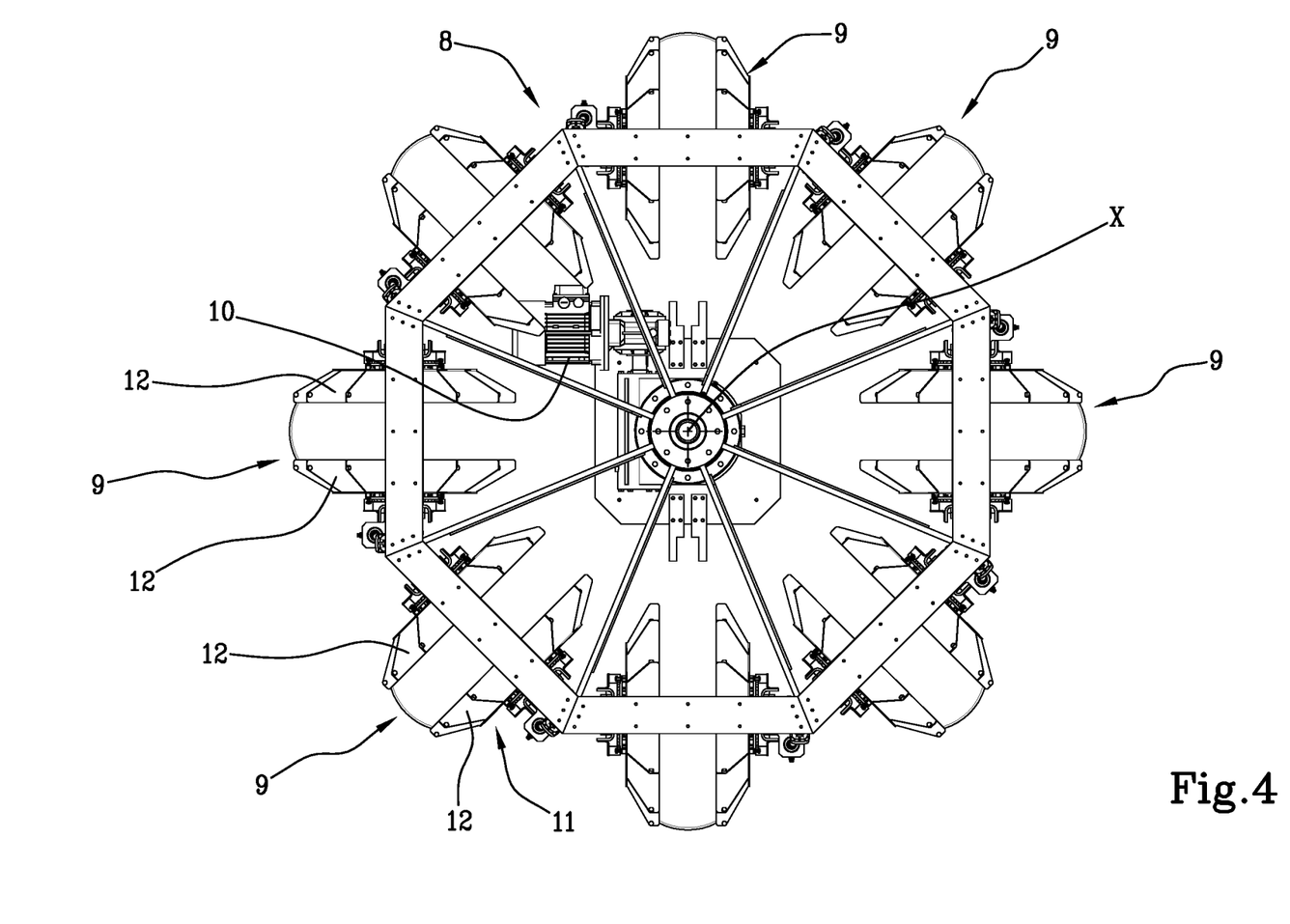
FIG. 4 shows a top plan view of the magazine of FIG. 3, with some parts removed to better illustrate others.

The carousel 8 has a plurality of retaining members 9 for retaining at least one frozen food product P, which are arranged along a substantially circular path defined by said carousel 8 (FIG. 4).

The carousel 8 is preferably associated with respective motor means 10, not described in detail since they are well known, suitable to rotate the carousel 8 itself around the axis X and under a plurality of operating conditions in which at least one retaining member 9 is arranged in the area of said opening 6.

In particular, the motor means 10 are preferably arranged below the carousel 8, at the base 5a to rotate said carousel 8 around the axis X arranged vertically with respect to the surface bearing the chamber 5.

Still with reference to FIG. 3, it should be noted that the frame 7 has a cylindrical shape with a polygonal section in which the retaining members 9 are arranged in the area of the peripheral extension of said frame 7.

The accompanying figures show eight retaining members 9 purely by way of a non-limiting example.

It should however be specified that any number of retaining members 9 can be present, according to the various manufacturing requirements and the number of different types of products P which must be dispensed by the present apparatus 1.

In particular, each retaining member 9 has a plurality of gripping elements 11 mutually overlapped and movable along a closed loop path in a direction parallel to said longitudinal axis X of the carousel 8.

In this situation, the gripping elements 11 of each member 9 are stacked on a column, which extends along said closed loop path.

Figure 3A:
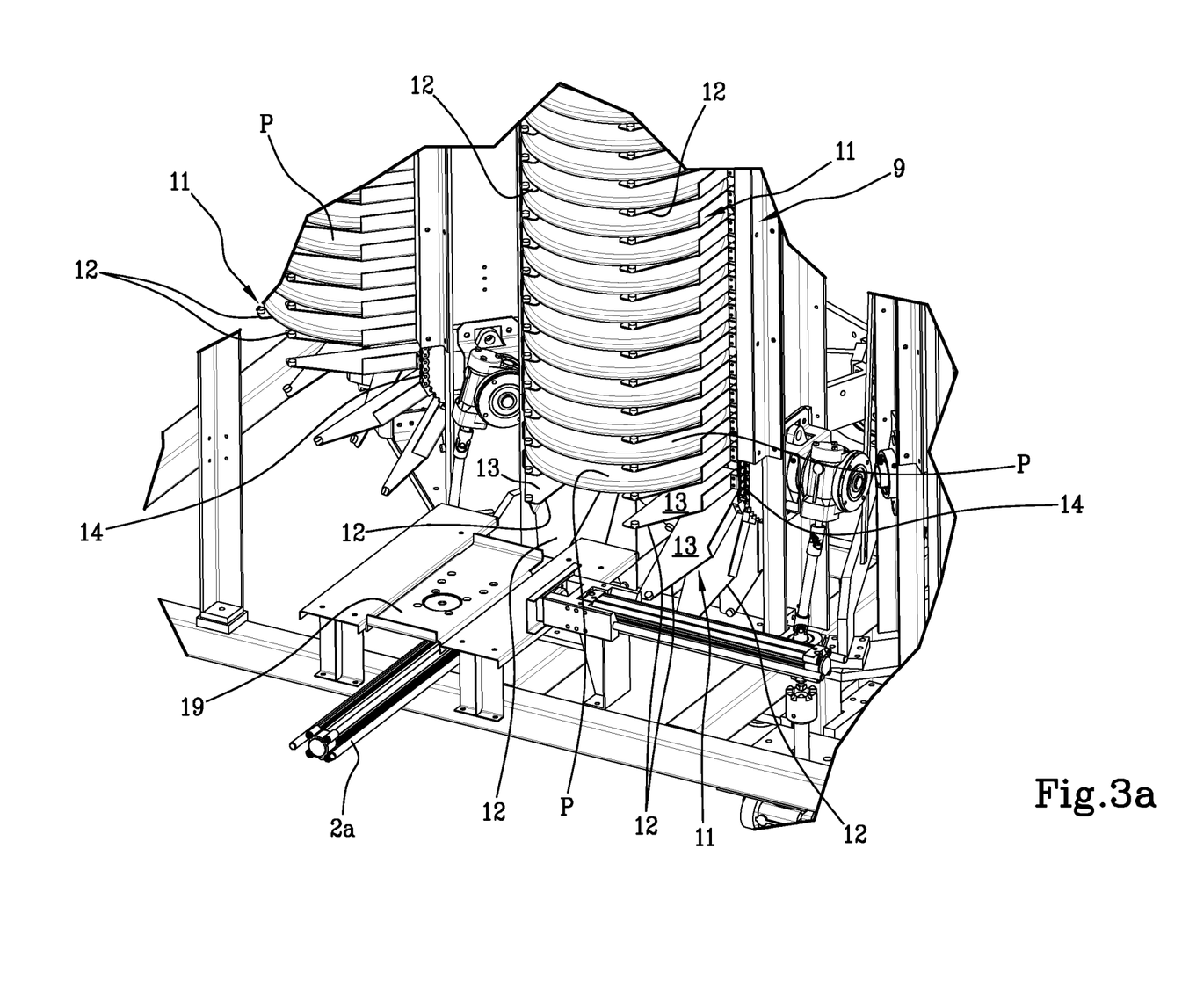
FIG. 3*a* shows an enlargement of a constructional detail of FIG. 3.

As better illustrated in the enlarged view of FIG. 3a, each gripping element 11 comprises two adjacent, mutually separate (not in mutual contact) portions 12, which define a single support surface 13 for a respective food product P.

The retaining member 9 also has a pair of motorized belts 14, which are associated with the portions 12 and suitable for conveying the portions 12 themselves. This movement defines the feed of each gripping element 11 along the closed loop path.

In this way, when a respective retaining member 9 is arranged at the opening 6, the belts 14 are activated to move downwards all the gripping elements 11 that belong to that member 9.

Advantageously, the elements 11 with the respective products 9 are arranged sequentially at the opening 6 in order to allow their removal from the magazine 3.

The apparatus 1 further comprises a supply line 15 for supplying the products P, which extends between a product P loading station arranged in the area of the magazine 3 and a dispensing station for dispensing said food products P.

In detail, the supply line 15 advantageously comprises a first oven 16 arranged downstream of the loading station and configured to thaw the products P leaving the magazine 3, and a second oven 17 interposed between the first oven 16 and the dispensing station.

This second oven 17 is preferably configured to cook the thawed and semi-cooked product P in the first oven 16, at a given temperature depending on the type of the product P itself.

In other words, the semi-cooked and frozen product exiting the magazine 3 (through the opening 6) is first thawed in the first oven 16 and subsequently heated in the second oven 17 to finish the cooking and define a cooked product P ready for consumption.

The ovens 16 and 17 are not described in detail since they are well known. These ovens have respective logical control units adapted to define the time of residence of each product P therein and the temperature depending on the type of the product P leaving the magazine 3.

The supply line 15 also comprises a conveyor belt 18 for feeding the products P from the loading station to the dispensing station. The loading station, located at the opening 6, has at least one flat element 19 movable through the opening 6 itself between a first condition in which it extends between the adjacent portions 12 to load the product P and a second condition in which it is arranged on the belt 18 for feeding the product along the line 15.

With particular reference to FIG. 3a, it should be noted that the flat element 19 defines a surface that is coplanar with the support surface 13 in the respective first condition, i.e. when this element is inside the chamber 5 and interposed between two portions 12 of a respective gripping element 11.

The flat element 19 is preferably associated with a linear actuator 20 adapted to move the element 19 with a back and forth motion between the first and the second condition.

Accordingly, the element 19 extracts a respective product P from the magazine 3 placing it on the belt 18.

The first and the second oven 16, 17 comprise respective baking chambers each of which having an input and an output for the food product P. In this situation, the conveyor belt 18 extends partially inside each chamber 16, 17 between the respective inputs and outputs in order to position the product P for the thawing and cooking operations.

Advantageously, the entire line 15 extends around the side walls 5c of the chamber 5 and in particular in the area of two adjacent side walls 5c.

In this way, as shown in the views of FIGS. 1 and 2, the two ovens 16, 17 are spaced apart by a central portion of the supply line 15 and extend along respective mutually perpendicular directions.

Therefore, the entire line 15 is close to the magazine 3, with the consequent formation of a particularly compact apparatus 1 in terms of overall volume.

The apparatus 1 further comprises packaging means 21 located in the area of the dispensing station for arranging each product leaving the supply line 15 inside a respective package C.

Figure 5:
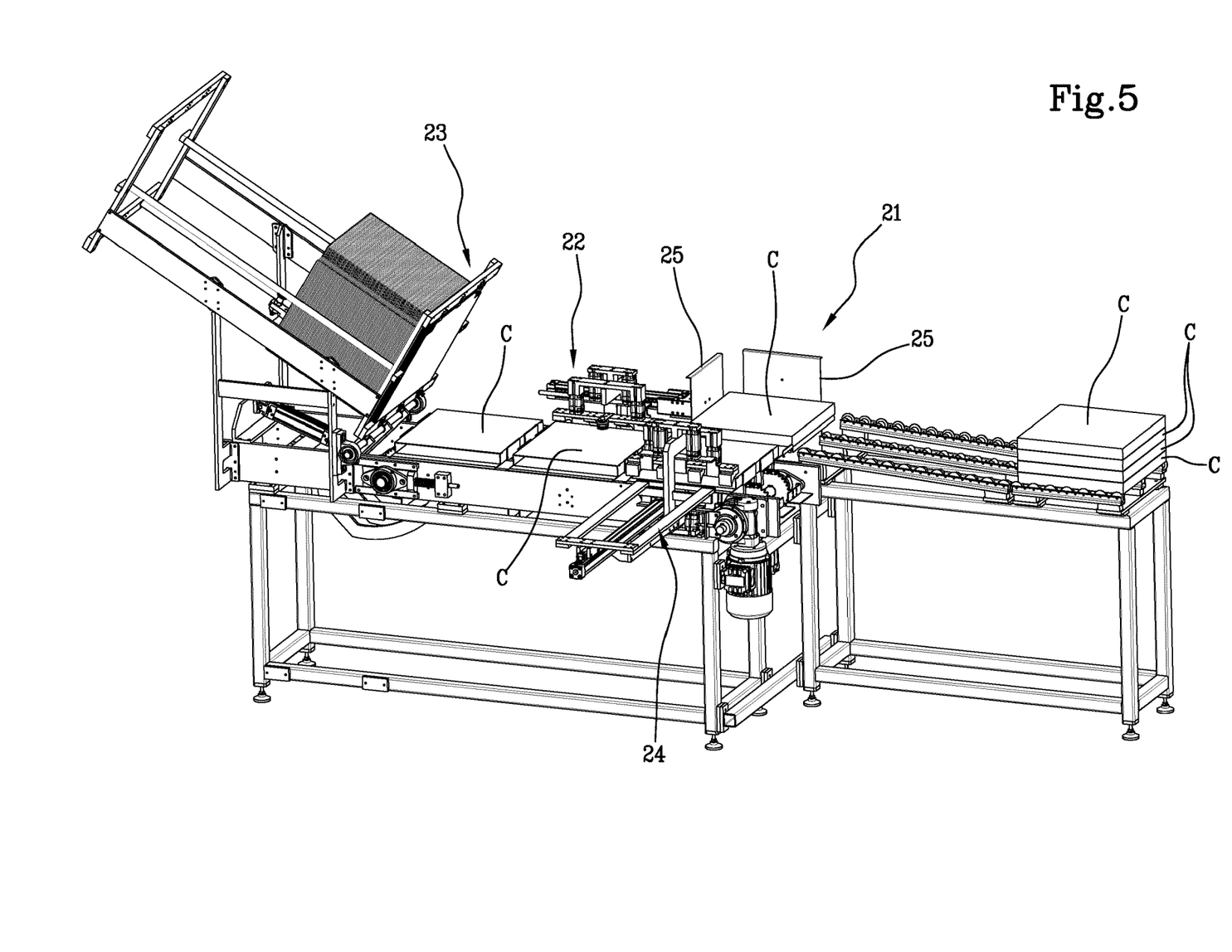
FIG. 5 shows a perspective view of means for packaging bakery products, which form part of the apparatus according to the present invention.

The packaging means 21, which are shown in detail in FIG. 5, comprise a forming member 22 for forming a plurality of packages C, which sequentially configures each package C into a first semi-open configuration.

The forming member 22 preferably comprises a supporting surface 22 for the package C that is fed from a storage area 23 housing the package C itself in a respective closed configuration with reduced overall dimensions. In particular, the forming member 22 is configured to receive each package C when it falls from the storage area 23, which is automatically partially opened.

In this situation, the package C in the forming member 22 has a box-shaped configuration in which at least one side is open for insertion of the respective product P, in particular a pizza P.

In order to insert the product P in the package C, a pusher element 24 is provided for intercepting the product P leaving the line 15 and feeding it through the open side of the package C.

The packaging means 21 also comprise sealing means 25 to define a sealed package C containing the product P.

Preferably, the sealing means 25 are arranged downstream of the pusher element 24 and comprise at least one operatively active actuator on respective lateral flaps of the semi-open package C.

The actuator is adapted to fold said flaps and define said sealed package C.

It should be noted that the size and structure of the package C are defined according to the products P that are fed by the line 15.

In the specific case of pizzas P, the packages C are preferably made of food-grade cardboard, which is capable of maintaining the temperature of the product P coming out of the second oven 17.

Advantageously, the food product P coming out of the apparatus 1 is ready for consumption and at the same time able to retain its characteristics for a non-immediate, but immediately subsequent consumption (such as a take-away product that needs not to be consumed on the spot).

In fact, the package C guarantees the maintenance of the organoleptic qualities of the product while avoiding heat exchange and the rapid cooling/deterioration of the products.

Furthermore, it should be noted that the apparatus 1 described above has very limited overall dimensions and at the same time is capable of storing in a storage (frozen) condition a large quantity of bakery products, in particular different types of pizzas.

This advantage is given by the structure of the magazine containing the carousel 8 and by the arrangement of the line 15, which surrounds, at least partially, the chamber 5.

Advantageously, the magazine 3 can also contain a wide range of bakery products that are different from each other, such as for example different types of pizzas that are fed and prepared by the apparatus 1.

A further important advantage of the present invention is the quality of the product P that is stored and supplied by the apparatus 1 in a ready-to-use configuration.

In fact, thanks to the thawing operation in the first oven 16 and the baking operation in the second oven 17, it is possible to provide a high-quality product P which is capable of maintaining the flavour characteristics of the food composing the product P itself.

In this respect, it should be noted that the second oven 17 finishes the cooking of the product P, which is stored in a partially cooked condition. Lastly, a further major advantage of the present invention is that the finished product P can be dispensed in an automated and continuous manner, i.e. over an indefinite period and without interruption (24 hours a day). This advantage is given by the possibility of managing in a totally automatic manner the dispensing of the product, which may then be prepared at any time of the day and for an indefinite period.

The invention claimed is:

1. An apparatus for the preparation and dispensing of bakery food products, in particular pizzas, comprising:
   a magazine (2) containing a plurality of food products (P) having a storage compartment (3) for storing said products (P) in a respective semi-cooked condition;
   said magazine comprising a chamber (5) internally defining said storage compartment (3) and having at least one opening (6) for connecting said loading station with said compartment (3), and a carousel (8) arranged inside said compartment (3) and rotatable about a respective longitudinal axis (X);
   said carousel (8) having a plurality of retaining members (9) for retaining at least one frozen food product (P), which are arranged along a substantially circular path defined by said carousel (8) and motor means (10) associated with said carousel in order to rotate it under a plurality of operating conditions in which at least one retaining member (9) is arranged in the area of said opening (6);
   each retaining member (9) comprising a plurality of gripping elements (11) mutually overlapped and movable along a closed loop path in a direction parallel to said longitudinal axis (X) of the carousel (8);
   each gripping element (11) presenting two adjacent portions (12) defining a support surface (13) for a respective food product (P), said retaining member (9) further presenting a pair of motorised belts (14) for conveying said portions (12) for moving the gripping elements (11) along the closed loop path;
   said apparatus further comprising:
   cooling means (4) arranged inside the magazine (2) to keep the compartment (3) of said food products (P) at a predetermined freezing temperature;
   a supply line (15) for supplying said food products (P) extending between a product loading station arranged in the area of the magazine (2) and a dispensing station for dispensing the food products (P);

said supply line comprising a first oven (16) arranged downstream of the loading station and configured to thaw the food products (P) leaving the magazine (2), and a second oven (17) interposed between said first oven and said dispensing station and configured to cook the thawed food product at a given temperature depending on the type of the product (P) itself; and packaging means (21), located in the area of said dispensing station to arrange each product (P) leaving the supply line (15) inside a respective package (C).

2. An apparatus according to claim 1, characterized in that said line (15) extends around an outer portion of said chamber (5) and that said first and second ovens (16, 17) are spaced apart by a central portion of said supply line (15).

3. The apparatus according to claim 1, characterized in that said carousel (8) comprises a support frame (7) having a polygonal cross-section cylindrical shape, said retaining members (9) being arranged in the area of the peripheral extension of said frame (7).

4. The apparatus according to claim 1, characterized in that said supply line (15) comprises a conveyor belt (18) for feeding the products (P) from the loading station to the dispensing station; said loading station comprising a flat element (19) movable through the opening (6) between a first condition, in which it extends between the adjacent portions (12) to load the food product (P), and a second condition, in which it is arranged on the conveyor belt (18) to feed the product along the line (15).

5. The apparatus according to claim 4, characterized in that said flat element (19) defines a surface that is coplanar with the support surface (13) in the respective first condition; said flat element (19) being associated with a linear actuator (20) to move with a back and forth motion the element (19) itself between the first and the second condition.

6. The apparatus according to claim 4, characterized in that said first and second ovens (16, 17) comprise respective baking chambers each of which having an input and an output for the food product; said conveyor belt (18) extending inside each chamber between the respective inputs and outputs.

7. An apparatus according to claim 1, characterized in that said packaging means (21) comprise:

a forming member (22) for forming said package (C) into a first semi-open configuration;

a pusher member (24) for inserting said food product (P) exiting the second oven in said semi-open package (C); and sealing means (25) to define a sealed package (C).

8. The apparatus according to claim 7, characterized in that said forming member (21) comprises a supporting surface for the package (C) configured to receive the semi-open package when it falls; said pusher member (24) feeding each product arranged in the dispensing station to the area of said supporting surface.

9. The apparatus according to claim 7, characterized in that said sealing means (25) comprise at least one operatively active actuator on respective flaps of the semi-open package for folding the same and defining said sealed package (C).

* * * * *